United States Patent Office 3,514,474
Patented May 26, 1970

3,514,474
PROCESS FOR OXIDIZING SCHIFF BASES OF α,β-ETHYLENICALLY UNSATURATED KETONES
Sudarshan K. Malhotra, Northboro, Mass., assignor to The Dow Chemical Company, Midland, Mich., a corporation of Delaware
No Drawing. Filed July 29, 1968, Ser. No. 748,170
Int. Cl. C07c 167/34
U.S. Cl. 260—397.2                           11 Claims

ABSTRACT OF THE DISCLOSURE

In the process wherein α,β-ethylenically unsaturated ketones are converted into the corresponding Schiff base whereupon the Schiff base is oxidized with molecular oxygen and the resulting oxidation product hydrolyzed to the corresponding α,δ-diketone or δ-hydroxy-α-ketone; the improvement wherein the oxidation is catalyzed by the presence of a catalytic amount of a ferric salt.

Background of the invention

The production of an α,δ-ethylenically unsaturated diketone from an α,β-ethylenically unsaturated monoketone by converting the latter to a Schiff base by means of a primary amine is described in U.S. Pat. No. 3,381,021. The Schiff base thus prepared undergoes rearrangement and the rearranged product is oxidized with molecular oxygen to produce the corresponding γ-keto derivative of the Schiff base. The γ-keto Schiff base derivative is thereafter hydrolyzed to the corresponding α,δ-diketone. It has been found that this reaction period can be decreased by up to 20 to 30 times by the inclusion of a catalytic amount of ferric salt in the reaction mixture. The ferric salt catalyzes the rearrangement of the Schiff base thus increasing the rate at which the rearranged product is made available for oxidation. In addition, the ferric salt catalyzes the oxidation of the rearranged product. It has further been discovered that the presence of a catalytic amount of ferric salt also catalyzes the oxidation of the Schiff base of a γ-methyl-α,β-ethylenically unsaturated ketone to the corresponding δ-hydroxy-α-ketone.

Prior art

The process of the present invention is an improvement upon the method for the preparation of α,δ-diketones taught in U.S. Pat. No. 3,381,021. The use of the ferric salt catalyst decreases the reaction period by a factor of 20 or more and thus greatly enhances the value of the process.

Description of the invention

The process of the present invention comprises an improvement in the method of producing α,δ-ethylenically unsaturated diketones and α-keto-δ-hydroxy derivatives from α,β-ethylenically unsaturated ketones. In the process of the present invention the α,β-ethylenically unsaturated ketones are reacted with a primary amine to produce a Schiff base. The Schiff base thereafter undergoes a rearrangement. This rearranged Schiff base is oxidized to produce an intermediate product which is thereafter hydrolyzed to the corresponding α,δ-ethylenically unsaturated diketone or δ-hydroxy-α-ketone.

The oxidation of the Schiff base rearrangement product is effected by molecular oxygen with the reaction taking place readily at temperatures between 5° and 85° C. The rearrangement of the Schiff base may be depicted as follows:

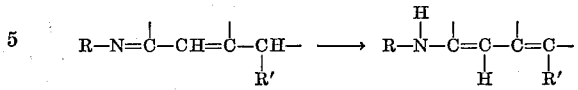

In the present specification and claims R represents cyclohexyl or benzyl and R' represents hydrogen or methyl. When R' represents hydrogen the final product obtained as a result of the acid hydrolysis is a compound having keto groups in the α and δ positions, hereinafter called an α,δ-diketone whereas when R' represents methyl the final product is the δ-hydroxy-α-ketone.

The improvement of the present invention comprises carrying out the oxidation of the Schiff base in the presence of a catalytic amount of ferric salt such as ferric chloride, ferric nitrate, ferric acetate or ferric cyanide with ferric chloride being preferred. The catalyst is employed in an amount equivalent to from about 0.01 to 0.5 molar equivalent with respect to the Schiff base. In carrying out the reaction, the primary amine, the α,β-ethylenically unsaturated ketone, and metal catalysts are dissolved in an inert organic solvent as reaction media. Representative solvents include benzene, dimethylsulfoxide, the dimethyl ether of dimethylene glycol (glyme) and diethyl ether of diethylene glycol. When employing solvents sch as benzene, it may be necessary to employ a co-solvent such as methanol, ethanol, isopropanol, hexamethylphosphoramide, dimethylformamide, dimethyl sulfoxide or dimethylacetamide to dissolve the catalyst and produce a homogeneous reaction mixture. After the Schiff base is dissolved in the inert organic solvent, molecular oxygen is added to the reaction medium while the temperature of the reaction mixture is maintained within the reaction temperature range and preferably at room temperature. In a convenient procedure, air is bubbled through the reaction mixture. Following the addition of the molecular oxygen, the reaction mixture is acidified by the addition of acids such as dilute acetic, hydrochloric, oxalic or sulfuric. The acid hydrolyzes the γ-keto Schiff base compound to the corresponding α,δ-diketone or δ-hydroxy-α-ketone. The desired product is then separated from the reaction mixture by extraction with an organic solvent such as ether, benzene, ethyl acetate or methylene chloride and the organic extract neutralized with an aqueous base such as sodium bicarbonate. The dried solvent extract is thereafter concentrated in vacuo to remove the low boiling constituents and obtain the product as a residue.

In the present invention, representative α,β-ethylenically unsaturated ketones wherein R' represents methyl to be employed as starting materials include 6-methyl testosterone, 6-methyl-Δ⁴-cholestene-3- one and other 6-methyl steroids.

Specific embodiments

The following examples are merely illustrative and are not deemed to be limiting.

EXAMPLE 1

The benzylamine Schiff base of 10-methyl-Δ¹⁽⁹⁾-octalone-2 (20 grams) and ferric chloride (500 mg. in 50 milliliters of hexamethylphosphoramide) were dispersed in 950 milliliters of benzene. The reaction mixture was maintained at room temperature and air was bubbled through the reaction mixture for a period of 1 hour by means of a gas dispersion tube. The temperature of the reaction mixture was maintained constant during the oxidation period by placing the reaction vessel in a water bath. Following the addition of the air to the reaction mixture, the reaction mixture was made acidic by the addition of 50 milliliters of 10 percent HCl and the resulting acidic mixture stirred for 30 minutes. The acidic reaction mixture was thereafter extracted with ether and the ether extract washed with sodium carbonate, dried with anhydrous magnesium sulfate and concentrated in vacuo to give a viscous oily product. This viscous oily material was fractionally distilled to produce the 10-methyl-$\Delta^{1(9)}$-octalin-2,8-dione product boiling at 90° to 95° C. at 0.7 millimeter of mercury. The distilled product was crystallized from methanol and the crystallized product found to melt at 70° to 72° C.

EXAMPLE 2

The benzylamine Schiff base of testosterone (270 mg.; 0.72 mmole) is dissolved in 250 milliliters of benzene. To this solution is added 50 milligrams of ferric chloride dissolved in 5 milliliters of hexamethylphosphoramide. Air is bubbled through the recation mixture thus prepared for 1 hour while the temperature of the reaction mixture is maintained at room temperature. Following the addition of the air, the reaction mixture is concentrated to about 100 milliliters whereupon 2 milliliters of 50 percent acetic acid are added and the resulting mixture heated to 100° C. The acidified mixture is then allowed to cool whereupon it is washed with aqueous sodium bicarbonate, dried and concentrated in vacuo to give an oily residue. This oily residue is chromatographed on a silica gel column to obtain the 6-ketotestosterone product which is crystallized from ethanol (M.P. 213°–215° C.).

EXAMPLE 3

In further operations carried out as described in Examples 1 and 2, the following compounds are prepared.

10-methyl-$\Delta^{1(9)}$-octalin-2,8-dione (M.P. 70°–72° C.) by oxidizing with air the cyclohexylamine Schiff base of 10-methyl-$\Delta^{1(9)}$-octalone-2 for 45 minutes at 15° C. in a benzene methanol mixture as reaction medium and with ferric acetate as catalyst.

Cholest-$\Delta^4$-en-3,6-dione (M.P. 123°–125° C.) by oxidizing with air the benzylamine Schiff base of cholest-$\Delta^4$-en-3-one at 70° C. for one half hour in a benzene-dimethylsulfoxide mixture as reaction medium and with ferric nitrate as catalyst.

8 - hydroxy-8,10-dimethyl-$\Delta^{1(9)}$-octalone-2 by oxidizing with air the benzylamine Schiff base of 8,10-dimethyl-$\Delta^{1(9)}$-octalone-2 for 1 hour at 25° C. in a benzene-hexamethylphosphoramide mixture with ferric chloride as catalyst. The 8-hydroxy-8,10-dimethyl-$\Delta^{1(9)}$-octalone-2 product is isolated by liquid-gas chromatography on a QF-1 column and its identity confirmed by infrared, ultraviolet, mass and nuclear magnetic resonance spectral analysis.

I claim:

1. In the process for producing an $\alpha,\delta$-diketone containing the moiety corresponding to the formula

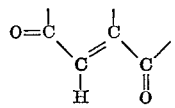

comprising (a) dissolving a Schiff base of an $\alpha,\beta$-ethylenically unsaturated ketone containing the moiety correspond to the formula

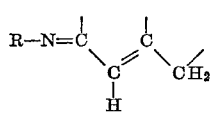

wherein R represents cyclohexyl or benzyl in an inert organic solvent as reaction medium whereupon the Schiff base of the $\alpha,\beta$-unsaturated ketone rearranges; (b) oxidizing the arrangement product with molecular oxygen to produce an $\gamma$-keto Schiff base intermediate containing the moiety corresponding to the formula

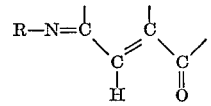

and (c) subjecting the $\gamma$-keto Schiff base intermediate to acid hydrolysis to produce the $\alpha,\delta$-diketone product; the improvement comprising adding a ferric salt catalyst to the oxidation reaction, in an amount corresponding to from about 0.1 to 0.5 molar equivalents of ferric salt for each molar equivalent of Schiff base.

2. A method claimed in claim 1 wherein the $\alpha,\beta$-ethylenically unsaturated ketone is an $\alpha,\beta$-ethylenically unsaturated keto-steroid.

3. The method claimed in claim 1 wherein the $\alpha,\beta$-ethylenically unsaturated ketone is testosterone.

4. The method claimed in claim 1 wherein the $\alpha,\beta$-ethylenically unsaturated ketone is cholest-$\Delta^4$-en-3-one.

5. The method claimed in claim 1 wherein the $\alpha,\beta$-ethylenically unsaturated ketone is 10-methyl-$\Delta^{1(9)}$-octalone 2.

6. The method of claim 1 wherein the ferric salt catalyst is ferric chloride, ferric nitrate, ferric acetate or ferric cyanide.

7. The method of claim 1 wherein the ferric salt catalyst is ferric chloride.

8. The method of producing an $\delta$-hydroxy-$\alpha$-ketone containing the moiety corresponding to the formula

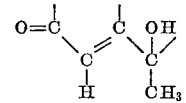

said method comprising (a) contacting a Schiff base of an $\alpha,\beta$-unsaturated ketone with a catalytic amount of a ferric salt catalyst in an inert organic solvent as reaction medium whereupon the Schiff base rearranges; (b) oxidizing the rearranged Schiff base with molecular oxygen to produce a $\delta$-keto Schiff base intermediate and (c) hydrolyzing the $\delta$-keto Schiff base intermediate with acid to form the $\delta$-hydroxy-$\alpha$-ketone product; said Schiff base of the $\alpha,\beta$-unsaturated ketone containing the moiety corresponding to the formula

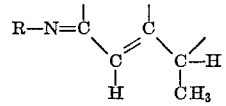

and the ferric salt catalyst is employed in an amount of from about 0.01 to about 0.5 molar equivalents with respect to the Schiff base.

9. The method claimed in claim 8 wherein the $\alpha,\beta$-ethylenically unsaturated ketone is a 6-methyl steroid.

10. The method of claim 8 wherein the ferric salt catalyst is ferric chloride, ferric nitrate, ferric acetate or ferric cyanide.

11. The method of claim 8 wherein the ferric salt catalyst is ferric chloride.

References Cited

UNITED STATES PATENTS 3,381,021   4/1968   Malhotra et al. _____ 260—397.2

ELBERT L. ROBERTS, Primary Examiner

U.S. Cl. X.R.

260—397.4, 586